Feb. 20, 1934.    A. BORCHERS ET AL    1,948,365
ELECTRIC MOTOR
Filed March 7, 1932    2 Sheets-Sheet 1

INVENTORS
ALWIN BORCHERS
BY GUSTAV PEISER.
ATTORNEYS

Feb. 20, 1934.  A. BORCHERS ET AL  1,948,365

ELECTRIC MOTOR

Filed March 7, 1932   2 Sheets-Sheet 2

INVENTORS
ALWIN BORCHERS.
GUSTAV PEISER.
BY Toulmin & Toulmin
ATTORNEYS

Patented Feb. 20, 1934

1,948,365

UNITED STATES PATENT OFFICE 1,948,365

ELECTRIC MOTOR

Alwin Borchers and Gustav Peiser, Dayton, Ohio, assignors to The Brown-Brockmeyer Company, Dayton, Ohio, a corporation of Ohio Application March 7, 1932. Serial No. 597,244

11 Claims. (Cl. 172—279)

This invention relates to improvements in electric motors, and has for its object to provide means for short-circuiting the armature bars of a commutator, and for withdrawing the brushes from the commutator.

It is particularly the object of this invention to provide, in connection with a commutator motor, means for short-circuiting the commutator bars and at the same time elevating the brushes from the bars. These objects are accomplished by the rotation of the commutator shaft. When the shaft first begins to rotate the brushes are engaged with the commutator bars. After a certain speed of rotation has been attained the bars are short-circuited and the brushes removed from contact with the commutator bars.

These and other advantages will appear from the following description taken in connection with the drawings.

Referring to the drawings.

Figure 1:
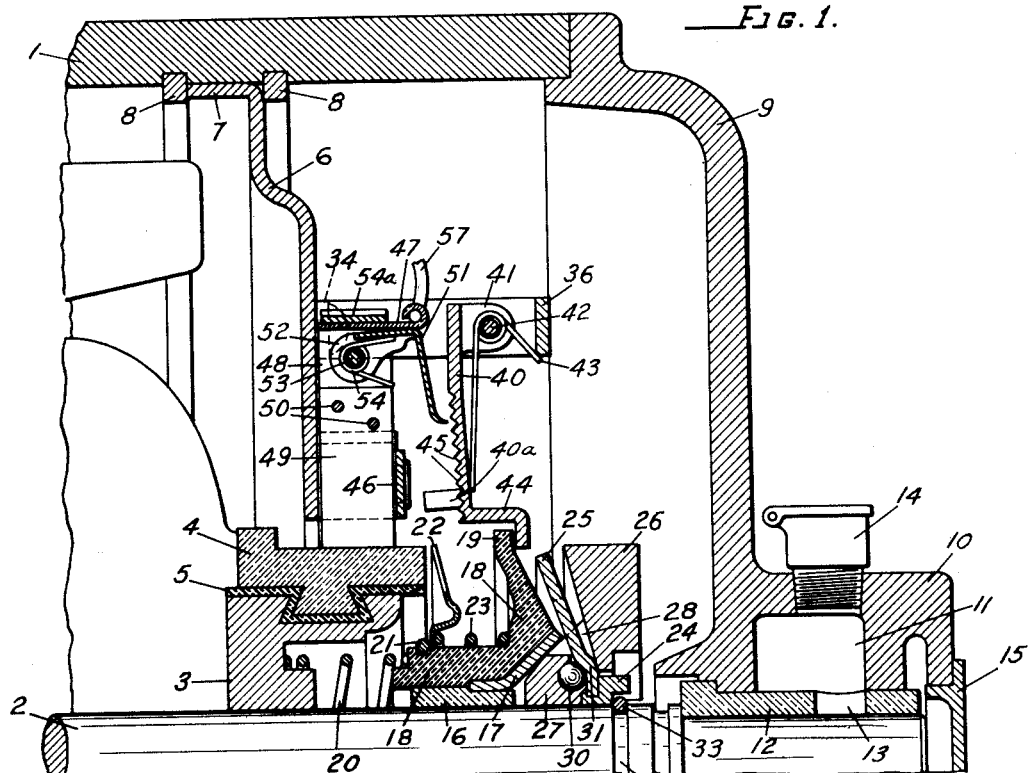
Figure 1 is a section through one-half of one end of a motor, showing the present improvements. In this figure the commutator bars are not short-circuited and the brushes are in contact therewith.

The numeral 1 is used to designate a casing which incloses the rotating and operating parts of the motor. Within this casing and properly supported thereby is an armature shaft 2, which has thereon the usual armature 3 carrying commutator bars 4, properly arranged around the commutator and insulated therefrom by means of insulating material 5.

Supported within the casing is a disc 6, which has on its periphery a laterally extending flange 7 which engages the inside surface of the casing. This disc is held in position in the casing by means of rings 8, properly seated in grooves in the casing, and between which the flange 7 fits for holding the disc in a fixed position. The central part of this disc has an opening therein, and in this opening, not indicated by a numeral, the commutator rotates.

On the end of the casing is a cap member 9, suitably held thereto by means of screws or bolts, or any other suitable means. The central part of this cap is provided with a hollow projection 10, which has therein a lubricant chamber 11. Within the projection 10 is a bronze bushing 12. This bronze bushing fits around a reduced end of the armature shaft 2 and has through it an opening or hole 13, by which lubricant may pass from the lubricant chamber to the shaft.

Lubricant is supplied to the lubricant chamber by means of a cup 14, attached to the projection 10 in the usual manner. The end of the projection is closed by means of a closure 15, which fits over the end of the armature shaft 2. By means of the cap 9, projection 10 and the closure 15 one end of the motor casing with the armature shaft therein is entirely inclosed and housed.

Supported on the armature shaft for longitudinal movement thereon is a bronze short-circuiting guide collar 16, which carries on one end a cone-shaped cam disc 17. Around the collar 16 and the disc 17 is a bakelite sleeve 18. This sleeve may be made of any suitable insulating material. Bakelite has been found to be very efficient for that purpose. The bakelite sleeve has a flange 19 extending substantially radially therefrom.

Between the armature 3 and the bakelite sleeve is a spring 20, which tends to hold the bakelite sleeve, the bronze collar and the cam disc in their extreme righthand position, as shown in Figure 1. Around the periphery of the bakelite sleeve is a removable wire ring shoulder 21, which forms a stop for a spring copper disc-shaped cone member 22. This copper disc member acts as a contact for engaging the commutator bars and short-circuiting them, and is held in engagement with the shoulder 21 by means of a spring 23, except when the disc is in contact with the commutator for short-circuiting it, as shown in Figure 2.

Located around the armature shaft is a ring 24, which has extending upwardly therefrom a cone-shaped disc guide member 25. This cone-shaped guide member inclines axially toward the commutator bars, as clearly shown in both Figures 1 and 2. This guide member supports weights consisting of an outer part 26 and an inner part 27. Each weight has a pair of webs 28, connecting the two parts thereof. The webs of each weight fit into slots 29 in the guide 25. Each weight is provided with a flat surface that substantially corresponds in shape and inclination to the surface of the guide so that the weights may be guided to and from the armature shaft, both radially and axially by means of the guide.

Figure 2:
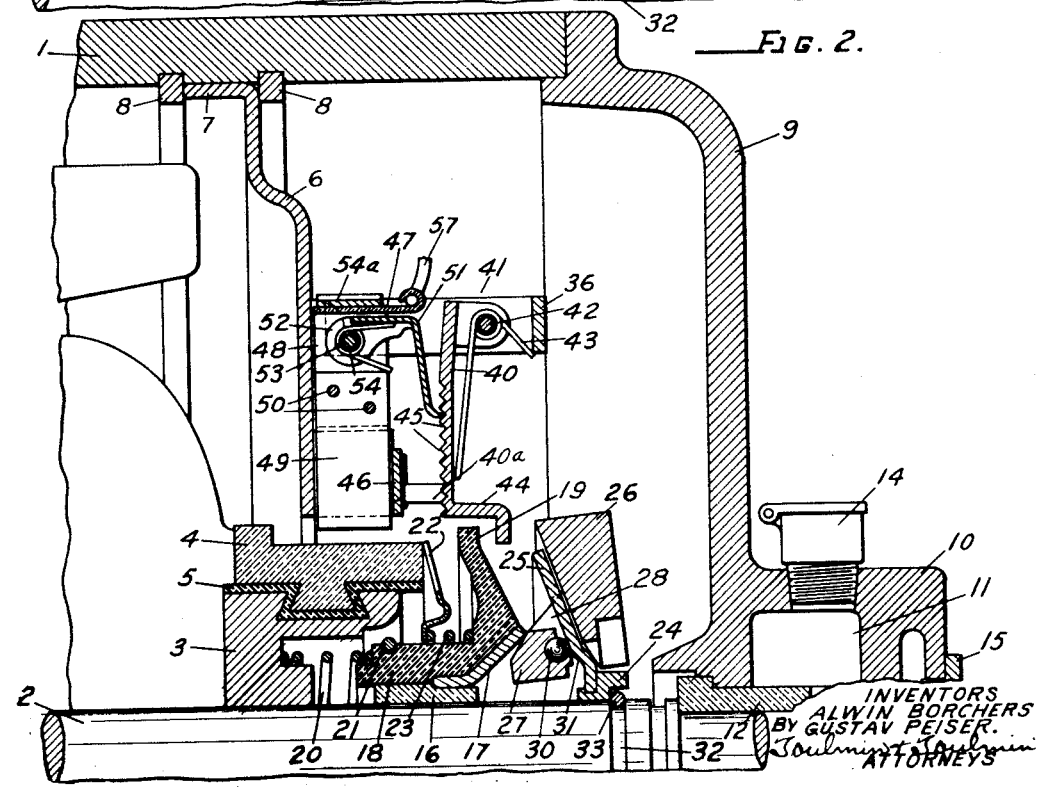
Figure 2 is a similar view but with the commutator bars short-circuited and the brushes elevated off of the commutator bars. In this figure the space between the elevated brush and the commutator has been exaggerated for purposes of illustration.

Each weight is provided with a pair of balls 30 adapted to engage the inside part of the guide, as shown in both Figures 1 and 2. When the parts are in the position shown in Figure 1 the ball of each weight rests beneath a shoulder 31 on the guide 25.

As the speed of rotation of the armature shaft increases the centrifugal force of the weights tends to force them away from the shaft. When the centrifugal force becomes sufficiently great the weights are caused to snap the balls beyond the shoulder 31 so that quick action thereafter takes place and short-circuiting is rapidly accomplished. The ring 24 is held in place on the shaft by means of a worm 33, located in a groove 32 around the shaft for that purpose.

To the disc 6 is attached a pair of strap members 34. Each strap member is attached at its ends by means of screws 35 to the disc. Adjacent each end of the strap there is a loop 36 extending outwardly and away from the disc to form supports for the mechanism that removes the brushes from the commutator bars. Each loop extends a substantial distance from the disc 6, and has adjacent thereto, on the side opposite the screw 35, a bench-like section 37. Between the two bench-like sections is an intermediate portion 38 attached to the disc 6 by means of a screw 39. Pivoted between the arms of each loop is a brush lifter lever 40, which has extending laterally from one end thereof, at each side, a flange or bracket 41 by which the lever is pivoted to the loop by means of a pivot pin 42.

For urging the brush lifting lever in one direction there is provided a spring 43. This spring is coiled around the pin 42 and has one end engaging the looped part of the strap while the other end engages the brush lifting lever remote from the pivot pin. Each brush lifting lever has its end opposite the pivot pin offset and provided with lateral arms to form an arcuate engaging portion 44 for the engagement with the flange 19 on the bakelite sleeve.

The face of the brush lifting lever opposite the spring 43 is provided with teeth 45 adapted to engage a pawl member for removing the brush from the commutator bars. Each brush is supported by means of a loop 46, suitably attached to the disc 6. The brush is adapted to move radially to and from the commutator through the loop. For limiting the brush lifting movement of the lever 40 a stop 40a is provided thereon for engaging the loop 46. When the brush is lifted and the commutator bars are short-circuited there is a clearance between the arcuate portion 44 and the flange 19.

Each brush is composed of a copper plate 47, which is bent to form parallel sides 48 between which a carbon brush 49 is attached by means of rivets or bolts 50. Suitably supported at the looped end of the copper plate is a brush lifting pawl 51. This pawl has on each side a lateral flange 52, by means of which the pawl is pivoted on a pin 53 to the parallel sides of the copper plate.

There is provided a spring 54 coiled around the pin 53. One end of this spring is in engagement with the carbon brush member 49, while the other end tends to hold the pawl against the copper plate 47. The pawl part of the brush lifting pawl extends in the direction of the brush lifting lever 40 and is adapted to be engaged by the teeth 45 of this lever, as shown in Figure 2.

Figure 3:
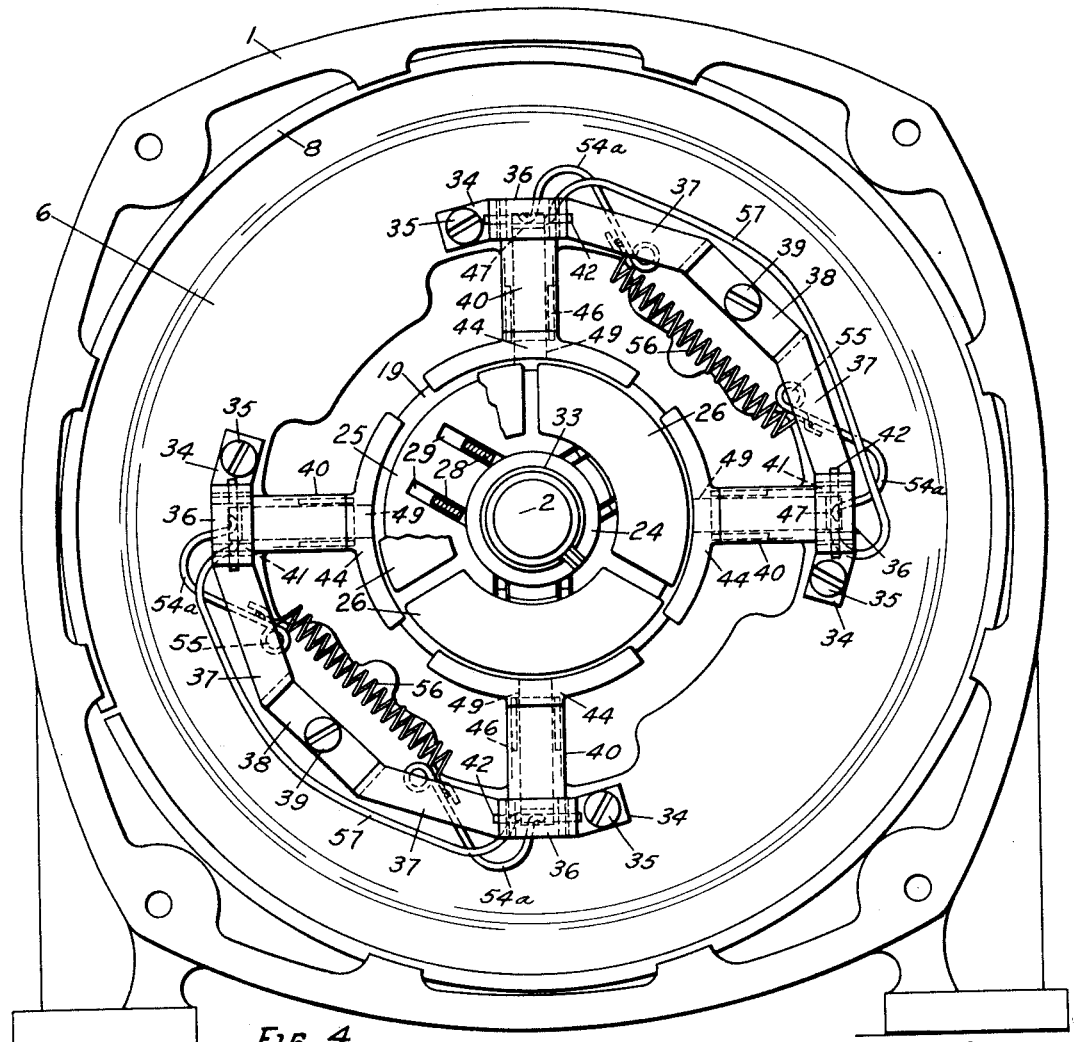
Figure 3 is an end elevation of a motor casing with the end thereof removed and part of the internal structure broken away to show the operating parts.
Figure 4:
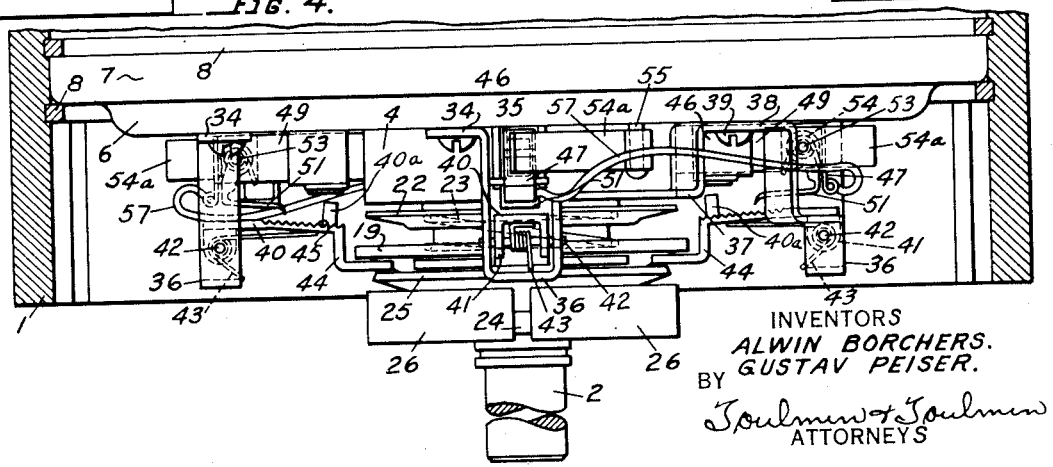
Figure 4 is a transverse section substantially through one end of the motor casing, as shown in Figure 3.

For the purpose of holding the brushes in contact with the commutator bars there is provided, in connection with each strap 34, a pair of spring levers 54a, each pivoted at one end 55 to the disc 6, with the other end engaging the end of the brush, as shown in Figure 3. There are two of these spring levers for each strap, and each pair of brushes. To each of the spring levers 54a is attached one end of a spring 56 for holding the spring levers in operative engagement with the brushes. The brushes formed into pairs by the strap 34 are connected by a wire 57.

When the motor is standing the bars are in the position shown in Figure 1. As the speed of rotation increases the weights are driven away from the armature shaft and guided by means of the guide 25 radially and axially with relation to the shaft. These weights, pressing against the cam disc 17, force the copper disc into engagement with the commutator bars, thereby short-circuiting the bars.

This radially outward and axial movement of the weights causes the bakelite sleeve and its flange to move from the end of the shaft, as shown in Figure 1. This movement releases the brush lifting levers so that they, under the action of the springs 43, engage the pawls and remove the brushes radially from the commutator bars, as shown in Figure 2. In Figure 2 the space between the brush and the commutator is exaggerated for illustrative purposes. The actual distance between the loop and the brush is very small. For instance, about one-sixty-fourth of an inch, which is just enough to form a clearance between the brush and the commutator.

On account of the ball and the shoulder the contact between the spring copper disc 22 and the commutator bars is brought about by a snap action, which causes a sudden contacting. Likewise, a sudden release of the brushes from the commutator is also effected.

We desire to comprehend within our invention such modifications as may be embraced within our claims and the scope of our invention.

Having thus fully described our invention, what we claim as new and desire to secure by Letters Patent, is:

1. In an electric motor, an armature shaft having commutator bars thereon, a removable supporting disc around the shaft, brushes supported by said supporting disc to engage the bars, means supported by the supporting disc adapted to move the brushes from the bars, and means operated by the rotation of the shaft to cause the bars to be short-circuited and the brush-moving means to move the brushes from the bars.

2. In an electric motor, in combination with a casing and an armature shaft having commutator bars thereon in the casing, a removable supporting disc in the casing around the shaft, brushes supported by the supporting disc for engagement with the commutator bars, means on the supporting disc adapted to hold the brushes free from the commutator bars, and means slidably mounted on the shaft for short-circuiting the bars and for holding said means out of operative position with relation to the brushes.

3. In an electric motor, in combination with an armature shaft having commutator bars thereon, brushes engaging said bars, means to move the brushes out of contact with the bars, a sleeve slidably mounted on the shaft, said sleeve having a radially extending flange at one end for holding the brush-moving means in inoperative position and a resiliently mounted short-circuiting disc at the other end, and means to move the sleeve to cause the disc to short-circuit the bars and the flange to release the brush-moving means whereby the brushes are moved out of contact with the commutator bars, said last-named means including a cone-shaped cam surface on the sleeve, an oppositely disposed cam disc on the shaft, and weights on the cone-shaped disc for engaging the cam surface.

4. In an electric motor, in combination with a casing and an armature shaft having commutator bars thereon in the casing, a support member in the casing, brushes supported by the support member for contact with the commutator bars, a bracket on the support adjacent each brush, means on the bracket tending to move the brush from contact with the commutator bars, and means movable longitudinally on the shaft to cause the bars to be short-circuited and to cause said means to move the brushes from the bars, said means including a sleeve of insulating material having at one end an integral flange and at the other end a resiliently mounted short-circuiting disc.

5. In an electric motor, in combination with an armature shaft having commutator bars thereon and brushes normally engaging the bars, a sleeve slidably mounted on said shaft, said sleeve having at one end a shoulder and at the other end a flange, a short-circuiting disc slidably and yieldingly mounted on said sleeve adjacent the shoulder, levers to move the brushes out of contact with the commutator bars, means acting on the sleeve to move it in one direction to hold the disc out of contact with the commutator bars and to cause the flange to hold the levers out of brush-moving position, and means to move the sleeve in the opposite direction to short-circuit the bars and to release the levers to move the brushes from the bars, said last-named means including a cam-surface on the sleeve, a cone-shaped support and weights mounted on said support for engaging the cam surface.

6. In an electric motor, in combination with an armature shaft having commutator bars thereon and brushes normally engaging the bars, a sleeve slidably mounted on said shaft, said sleeve having at one end a shoulder and at the other end a flange, a short-circuiting disc slidably and yieldingly mounted on said sleeve adjacent the shoulder, levers to move the brushes out of contact with the commutator bars, means acting on the sleeve to move it in one direction to hold the disc out of contact with the commutator bars and to cause the flange to hold the levers out of brush-moving position, and means to move the sleeve in the opposite direction to short-circuit the bars and to release the levers to move the brushes from the bars, said last-named means including a cam surface on the sleeve, a cone-shaped slotted disc and weights mounted on the cone-shaped disc in the slots for engagement with the cam surface.

7. In an electric motor, in combination with an armature shaft having a commutator thereon, a support around the shaft, a plurality of brushes slidably mounted on said support and engaging the commutator, a plate member attached to said support and formed into a bracket adjacent each brush, and means on each bracket tending to move a brush from contact with the commutator.

8. In an electric motor, in combination with an armature shaft having a commutator thereon, a support around the shaft, a plurality of brushes slidably mounted on said support and engaging the commutator, a plate member attached to said support and formed into a bracket adjacent each brush, and lever means on each bracket tending to move a brush from contact with the commutator.

9. In an electric motor, in combination with an armature shaft having a commutator thereon, a support around the shaft, a plurality of brushes slidably mounted on said support and engaging the commutator, a plate member attached to the support and formed into a bracket adjacent each brush, each brush having a pawl member thereon, and means on each bracket to engage the pawl member to move the brush from contact with the commutator.

10. In an electric motor, in combination with an armature shaft having a commutator thereon, a support around the shaft, a plurality of brushes slidably mounted on said support and engaging the commutator, a plate member attached to the support and formed into a bracket adjacent each brush, each brush having a pawl member thereon, means on each bracket to engage the pawl member to move the brush from contact with the commutator, and means on the shaft to operate said means.

11. In an electric motor, in combination with an armature shaft having a commutator thereon, a support around the shaft, a plurality of brushes slidably mounted on said support and engaging the commutator, a plate member attached to the support and formed into a bracket adjacent each brush, each brush having a pawl member thereon, means on each bracket to engage the pawl member to move the brush from contact with the commutator, and means on the shaft to operate said means and short-circuit the commutator.

ALWIN BORCHERS.
GUSTAV PEISER.